United States Patent [19]
Baviello, Sr.

[11] 3,830,260
[45] Aug. 20, 1974

[54] CONDUIT LEAK SEALING DEVICE

[76] Inventor: Michael A. Baviello, Sr., 100 Dearborn Ave., Rye, N.Y. 10580

[22] Filed: Sept. 12, 1972

[21] Appl. No.: 288,432

[52] U.S. Cl. ................................. 138/97
[51] Int. Cl. ............................. F16l 55/18
[58] Field of Search .......... 138/97, 98, 99; 166/139, 166/217; 100/286, 287; 254/122, 126

[56] References Cited
UNITED STATES PATENTS

| 581,209 | 4/1897 | Hughes | 138/98 |
|---|---|---|---|
| 751,596 | 2/1904 | Worsley | 166/139 X |
| 2,543,904 | 3/1951 | Ernst et al. | 254/122 |
| 2,546,361 | 3/1951 | Floyd | 254/122 |
| 2,672,161 | 3/1954 | Brauer | 138/97 |
| 2,672,162 | 3/1954 | Brauer | 138/97 |

*Primary Examiner*—Charles A. Ruehl

[57] ABSTRACT

A leak sealing device for sealing leaks in pipes, tubes and the like comprising a pair of spaced, elongated, generally parallel shoes having convex outer surfaces, linkage means pivotally interconnecting said shoes and actuating means mounted on one of the shoes for actuating the linkage means to move the shoes toward or away from each other. One of the shoes has a resilient plate rockably mounted thereon and carrying a gasket and layer of sealant adapted to be pressed against the inner surface of the pipe in the vicinity of the leak. The resilient plate tends to stabilize and guide the device as it is moved through the interior of the pipe.

10 Claims, 5 Drawing Figures

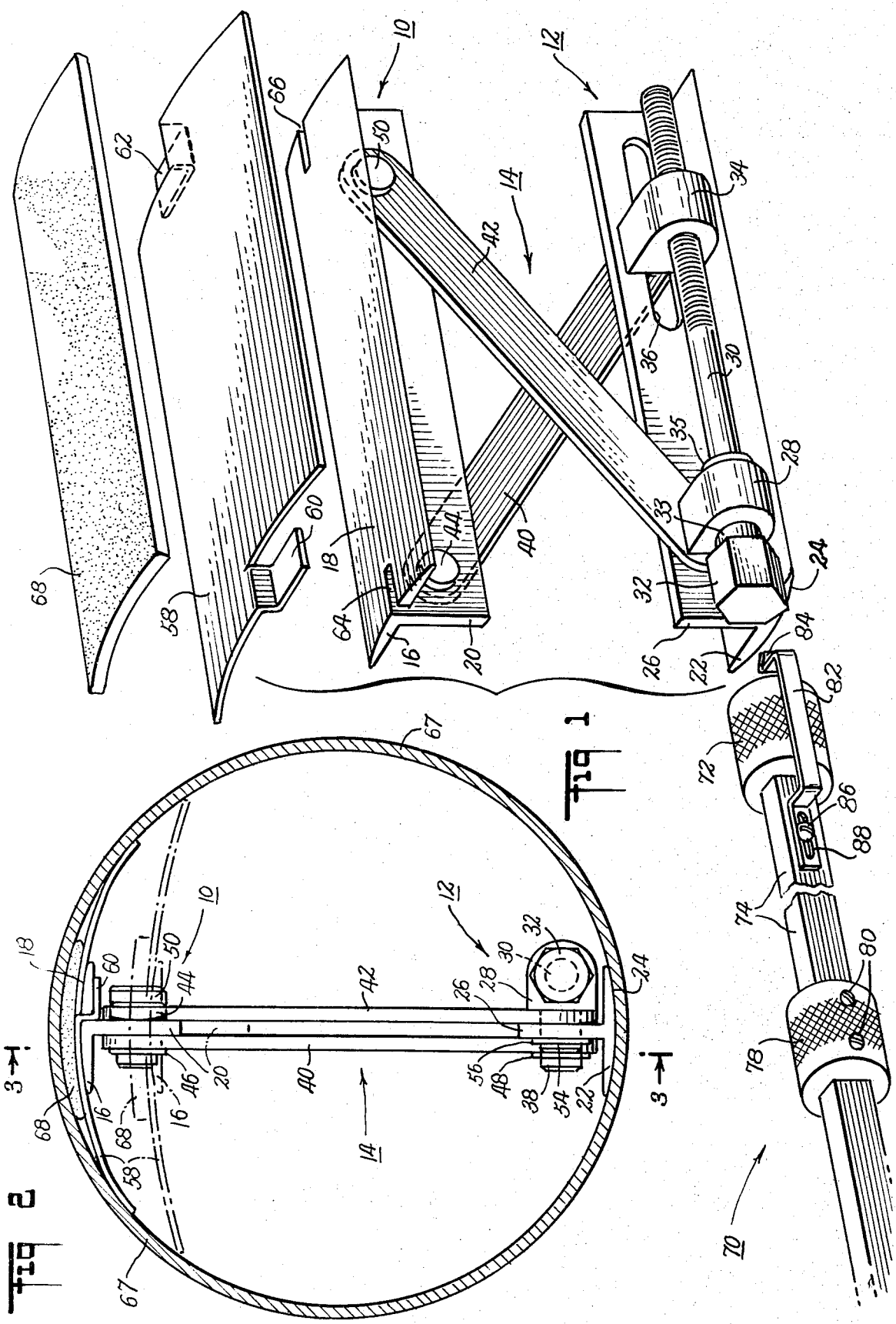

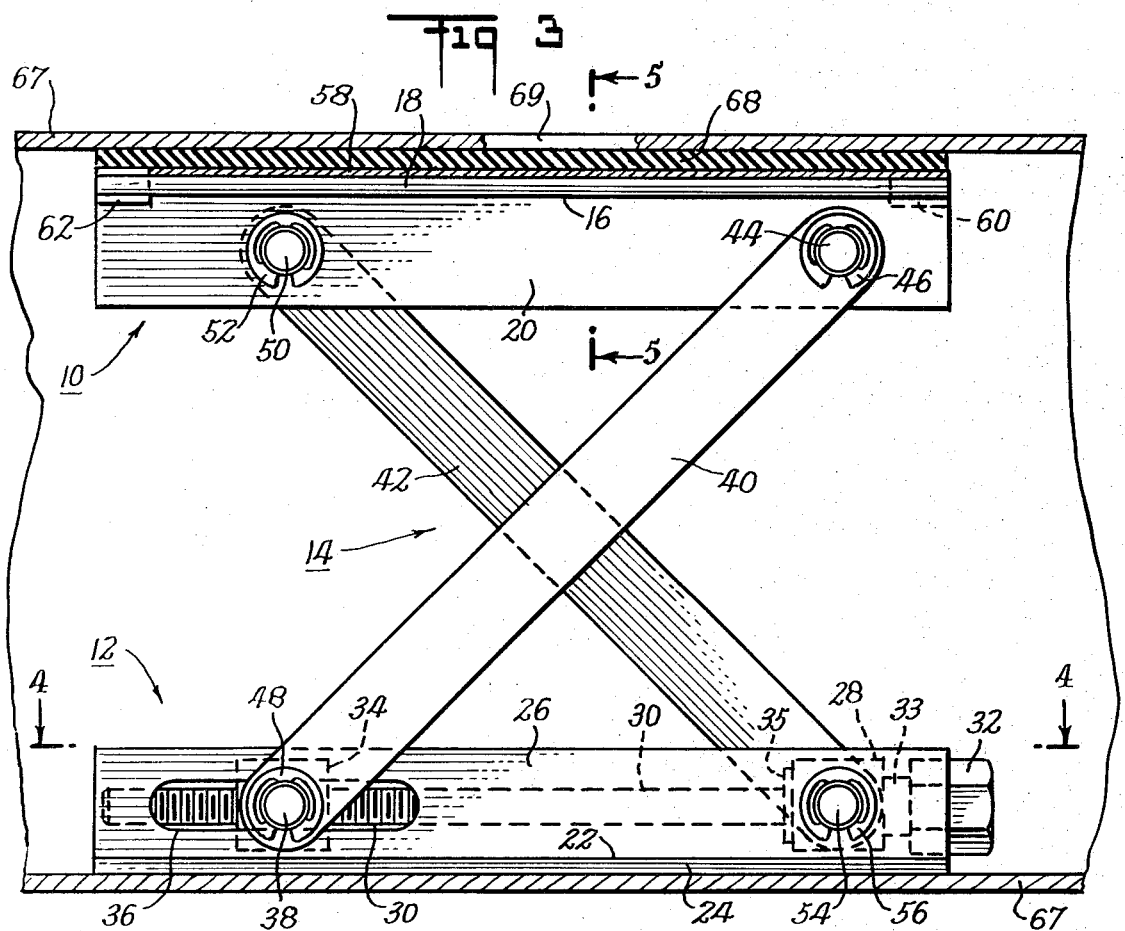
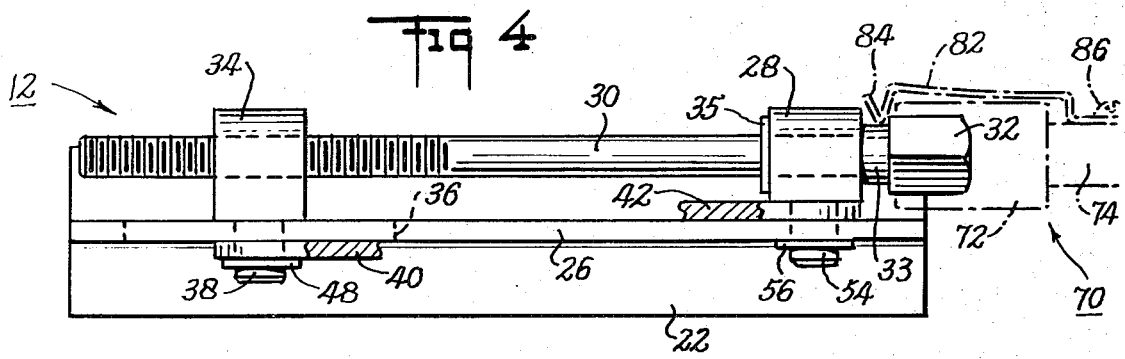
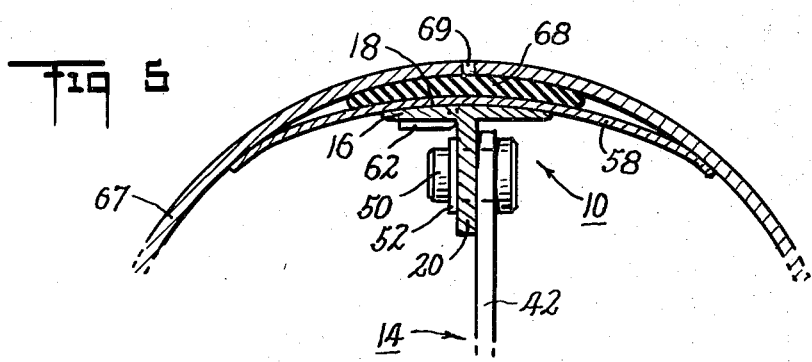

CONDUIT LEAK SEALING DEVICE

This invention relates to the repair of leaks in pipes, tubes and the like, and more particularly, to an improved device for plugging leaks in such conduits. The present device will be illustratively described as applied to the problem of plugging leaks in boiler tubes, although as the description proceeds, it will become apparent that the device can be equally well used for plugging leaks in other types of conduits as well.

One of the principal problems encountered in the operation of boilers arises out of the tendency of components of the boiler water to corrode the tubes and cause leaks, and the lack of a simple and effective method of repairing such leaks. The most common method of dealing with this problem involves blocking off the leaking tubes as leaks occur by driving plugs in the ends of the tubes. This method is subject to the disadvantage that as each tube is blocked the heat transfer area of the boiler is correspondingly reduced. Moreover, the vibrations generated as an incident of hammering a plug into a leaky tube may cause leaks to occur in other tubes of the boiler. Eventually it becomes necessary to shut down the boiler and completely retube it, an operation that is both time-consuming and expensive.

In an effort to avoid the disadvantages of the tube-blocking method of dealing with leakage, it has been proposed that such leaks be stopped by internal sealing of the boiler tube. In accordance with this proposal a collapsible sealing device, such as, for example, those disclosed in U.S. Pat. Nos. 2,672,161 and 2,672,162, is inserted in the tube to a point opposite the leak and expanded against the interior wall of the tube to seal the hole therein. In the sealing devices of these patents expansion of the sealing device is effected by means of a threaded rod which is coaxial with the tube and operates a toggle mechanism or pair of cam nuts to force oppositely disposed sealing members against the tube walls.

While the use of expandable sealing devices of this type have certain advantages in that they obstruct only a portion of the cross-section of the tube, and thus after the tube leak has been sealed, the tube can be returned to service with only a slight reduction in the heat transfer area thereof, such devices are subject to a number of disadvantages that militate against their use. More particularly, it is difficult to bring the sealing surface of such a device into precise registry with the hole in the boiler tube, especially in those cases where the hole is in the side of the tube and is located a substantial distance in from the end of the tube. Even though the sealing surface of the device is correctly oriented as it is inserted into the tube, rotation of the device as it is pushed through the tube may cause the sealing surface thereof to be misaligned when it reaches the area of the hole to be sealed. With sealing devices of the type disclosed in the patents referred to above, rotational adjustment of the position of the device to bring its sealing surface into registry with the leak cannot be effectively made within the tube. If the actuating member is loosely threaded into the expanding mechanism, rotation of the member will merely collapse or expand the device without changing its circumferential orientation. On the other hand, if the actuating member is tightly threaded into the expanding mechanism, rotation of the actuating member will rotate the device as a whole without expanding it against the tube wall as desired. In either event, the desired forcing of the sealing surface of the device against the portion of the wall of the tube containing leak will not be achieved.

It is accordingly an object of the present invention to provide an improved expansible sealing device for insertion into a conduit and expansion within the conduit to seal a hole in the wall thereof. It is another object of the invention to provide such a sealing device that is so constructed as to facilitate alignment of the sealing surface thereof with the leak or hole to be sealed. It is still another object of the invention to provide an internal leak-sealing device for a boiler tube that can be used with tubes of various diameters. Other objects of the invention will be in part obvious and in part pointed out hereafter.

The many objects and advantages of the present invention can best be understood and appreciated by reference to the accompanying drawings which illustrate a preferred embodiment of the invention and wherein:

FIG. 1 is an exploded perspective view of the leak sealing device showing the sealing members, expansible linkage and actuating mechanism thereof;

FIG. 2 is a transverse section showing the device in leak sealing position within a tube;

FIG. 3 is a vertical section taken on the line 3—3 of FIG. 2 showing in elevation the left side of the expansible linkage as illustrated in FIG. 2;

FIG. 4 is a horizontal section taken on the line 4—4 of FIG. 3 and showing the manner in which the journal block and adjustable nut are connected to the lower shoe of the sealing device; and FIG. 5 is a fragmentary vertical section taken on the line 5—5 of FIG. 3 and showing further details of the upper portion of the sealing device in sealing engagement with the tube to be sealed.

Referring to the drawings, and more particularly to FIG. 1, the device there shown comprises an elongated upper shoe 10, an elongated lower shoe 12, and interconnecting the shoes 10 and 12, an expansible linkage generally designated 14. Upper shoe 10 comprises a transverse web 16 having a convex outer surface 18 and a radial web 20. Lower shoe 12 comprises a transverse web 22 having a convex outer surface 24 and a vertical web 26.

Mounted on the web 22 and secured against lengthwise movement in respect thereto is a journal block 28 having screw 30 with a polygonal head 32 and adjacent shoulder 33 rotatably supported therein. The screw 30 is threaded into a nut 34 which is movable lengthwise of shoe 12 by rotation of the screw. As particularly shown in FIG. 4, the screw 30 is held against axial movement relative to block 28 by the shoulder 33 which confronts one side of the block and C-clamp 35 on the other side of the block. Referring to FIGS. 3 and 4, as well as to FIG. 1, the web 26 of shoe 12 has a guide slot 36 formed therein and the nut 34 has a rearwardly extending shank 38 that extends through slot 36 to restrict movement of the nut to a direction lengthwise of shoe 12.

The expansible linkage 14 comprises a pair of crossed links 40 and 42. Link 40 is pivotally connected at its upper end to the web 20 of upper shoe 10 by means of a bolt 44 which extends through the web and link and is secured by C-clamp 46. The lower end of link 40 is pivotally connected to the movable nut 34.

More particularly (see especially FIG. 4), the shank 38 of nut 34 extends through slot 36 and a hole in the lower end of link 40 and is secured by a C-clamp 48 in such manner that link 40 is pivotable in respect to nut 34 and shoe 12.

The upper end of link 42 is pivotally connected to web 20 of upper shoe 10 by a bolt 50 which extends through the web and link and is secured by a C-clamp 52. The lower end of link 42 is pivotally connected to the web 26 of lower shoe 12. More particularly (see especially FIG. 4), the journal block 28 is provided with a shank 54 which extends through holes in the lower end of link 42 and in the web 26 and is secured by means of a C-clamp 56. The construction is such that rotation of the screw 30 causes the links 40 and 42 to move the shoes 10 and 12 toward or away from one another depending upon the direction of rotation of the screw.

Referring particularly to FIGS. 1 and 2, upper shoe 10 has loosely connected thereto a curved resilient plate 58 which has at its opposite ends the lugs 60 and 62 that engage the slots 64 and 66, respectively, formed in the ends of shoe 10 to attach plate 58 to the shoe. As shown in phantom lines in FIG. 2, the plate 58, when unstressed, has a radius of curvature somewhat greater than that of the upper surface of shoe 10 and is somewhat wider than shoe 10. The loose connection between plate 58 and shoe 10 permits the plate to rock about its longitudinal axis relative to the shoe. As more fully described below, the plate 58 assists in guiding the present sealing device as it is inserted in a tube, such as the tube 67 of FIGS. 2 and 5, having a leak 69 to be sealed.

Secured to the outer surface of plate 58 is a layer 68 of a conventional gasket material, e.g., a cork or rubber gasket. As particularly shown in FIGS. 2 and 5, the gasket 68 is desirably somewhat narrower than plate 58. The outer surface of gasket 68 is provided with a suitable and conventional sealant or caulking composition to assist in achieving a tight seal against the inner surface of the tube 67.

Still referring to FIG. 1, rotation of screw 30 to effect expansion of linkage 14 may be conveniently achieved by means of an elongated socket wrench 70 having at its end a socket 72 adapted to engage the polygonal head 32 of screw 30. The socket wrench 70 is conveniently made in sections that can be assembled to vary the length of the wrench in accordance with the distance between the end of the tube and the point at which the leak in the tube wall is located. For example, the section 74 carrying the socket 72 may be connected to the section 76 of the wrench by a coupling 78 having set screws 80 for securing the adjacent ends of sections 74 and 76 within the coupling. The wrench sections 74 and 76 are desirably held within coupling 78 by set screws rather than being threaded therein in order to eliminate the possibility that the wrench sections might become detached as the sealing device is manipulated within the tube to be sealed.

Mounted on the socket wrench 70 near the socket 72 there is a detent spring 82 having an end projection 84 adapted to snap over the screw head 32 and prevent disengagement of the socket wrench from the sealing device while the sealing device is being positioned in the tube to be sealed and prior to the time the device is fully expanded against the tube wall. The spring 82 is mounted on wrench section 74 by means of a screw 86 which is positioned in a slot 88 formed in the detent in such manner that the spring is axially adjustable in respect to the socket wrench.

In accordance with a preferred method of using the present device, the interior of the tube to be sealed is initially cleaned to remove carbon deposits therefrom. The socket 72 of wrench 70 is pushed onto polygonal head 32 of screw 30 until projection 84 of spring 82 snaps around the screw head. The device in its collapsed state is then placed just inside the open end of the pipe and screw 30 is rotated to expand the device until the side edges of resilient plate 58 bear lightly against the interior wall of the tube as shown in phantom lines in FIG. 2. In this position the resilient plate serves to stabilize the device as it is moved into the tube. Also the plate 58 prevents the sealant layer on gasket 68 from bearing against the pipe wall until the device has been properly located in registry with the leak and fully expanded against the pipe wall.

After the device has been partially expanded as described above, it is pushed into the tube until the center of the device is substantially opposite the leak to be sealed. If necessary, the device is then rotated by circumferential movement of the socket wrench to bring the gasket 68 into circumferential registry with the leak. Because of the eccentric location of the axis of screw 30 near the periphery of the device, the device is held against rotation as it is moved axially in the tube. Also the eccentric location of the linkage actuating rod substantially facilitates rotational adjustment of the device to bring gasket 68 into registry with the leak.

When gasket 68 has been brought into registry with leak 69, screw 30 is rotated to complete the expansion of the device. Surface 18 of shoe 10 is forced against plate 58 which in turn presses gasket 68 and its sealant layer against the interior surface of tube 67 in the vicinity of leak 69, thereby effectively sealing the leak as particularly shown in FIG. 5. It should be noted that because of the eccentric location of the axis of screw 30 and the stabilizing effect of plate 58, there is little, if any, tendency of the device to turn as a whole when screw 30 is rotated to expand the device.

The plate 58, in addition to its guidance and stabilizing functions as described above, also improves the rangeability of the device, that is, its ability to seal leaks in tubes or pipes of different diameters. In the embodiment described above, the curvature of surface 18 of shoe 10 is the same as that of the inner surface of tube 67. If the plate 58 were omitted and the device used in a tube of smaller diameter, the shoe would exert less pressure on the center portion of gasket 58 than on the edge portions thereof. If, on the other hand, the device were used in a larger diameter tube, the shoe 10 would exert more pressure on the central portion of the gasket than on the edge portions thereof. By using a resilient plate 58 between the shoe and gasket, these pressure differences are minimized.

From the foregoing description it should be apparent that the present invention provides an exceptionally simple, inexpensive and effective device for sealing leaks in boiler tubes and other conduits. It can be readily positioned to the proper location in registry with the leak to be sealed and can be used effectively with a fairly wide range of boiler tube diameters. Since it occupies only a relatively small proportion of the tube cross-section, it does not seriously obstruct flow through the tube when the tube is returned to service.

It is, of course, to be understood that the foregoing description is intended to be illustrative only and that numerous changes can be made in the preferred embodiment described without departing from the spirit of the invention is defined in the appended claims.

I claim:

1. A leak sealing device for sealing leaks in pipes, tubes and the like comprising in combination a pair of spaced, elongated, generally parallel shoes having convex outer surfaces, linkage means pivotally interconnecting said shoes, and actuating means mounted on one of said shoes for actuating said linkage means to move said shoes toward or away from each other, said actuating means comprising a journal block secured to one of said shoes and having a threaded rod extending therethrough, a nut threaded on said rod and connected to a lever of said linkage mechanism and means for guiding said nut lengthwise of said one shoe, said threaded rod being substantially parallel to but substantially spaced from the central longitudinal axis of said device.

2. A device according to claim 1 wherein said linkage means comprises a pair of crossed links effectively pivotally connected near their ends to said shoes.

3. A leak sealing device for sealing leaks in pipes, tubes and the like comprising in combination a pair of spaced, elongated, generally parallel shoes having convex outer surfaces, linkage means pivotally interconnecting said shoes, actuating means mounted on one of said shoes for actuating said linkage means to move said shoes toward or away from each other and an elongated, curved, resilient plate loosely connected to the exterior of one of said shoes, said plate having a layer of gasket material thereon.

4. A device according to claim 3 wherein said resilient plate is wider than the shoe to which it is connected.

5. A device according to claim 3 wherein said actuating means is connected to one of said shoes and said resilient plate is connected to the other of said shoes.

6. A device according to claim 3 wherein the external surface of said gasket material has a layer of sealant thereon.

7. A device according to claim 3 wherein said resilient plate has a radius of curvature greater than that of the adjacent surface of the shoe on which it is mounted.

8. A leak sealing device for sealing leaks in pipes, tubes and the like comprising in combination a pair of spaced, elongated generally parallel shoes having convex outer surfaces, a journal block secured to one of said shoes, a threaded actuating rod extending through said journal block and having a nut threaded thereon, said one shoe having guide means cooperating with said nut to guide it lengthwise of said shoe, a pair of crossed links pivotally connected near one of their ends to longitudinally spaced points on the other of said shoes, the other end of one link being pivotally connected to said one shoe near said journal block and the other end of said other link being pivotally connected to said nut, whereby rotation of said actuating rod produces relative movement of said shoes toward or away from one another.

9. A leak sealing device according to claim 8 including an elongated resilient plate loosely connected to the exterior to one of said shoes, said plate having a layer of gasket material thereon.

10. A leak sealing device according to claim 9 wherein the external surface of said gasket has a layer of sealant thereon.

* * * * *